US005726773A

United States Patent [19]
Mehlo et al.

[11] Patent Number: 5,726,773
[45] Date of Patent: Mar. 10, 1998

[54] APPARATUS FOR SCANNING AND DIGITIZING PHOTOGRAPHIC IMAGE OBJECTS AND METHOD OF OPERATING SAID APPARATUS

[75] Inventors: Herwig Mehlo, Aalen; Karl-Heinz Prois, Heidenheim; Michael Raasch, Aalen-Wasseralfingen, all of Germany

[73] Assignee: Carl-Zeiss-Stiftung, Heidenheim, Germany

[21] Appl. No.: 563,550

[22] Filed: Nov. 28, 1995

[30] Foreign Application Priority Data

Nov. 29, 1994 [DE] Germany .............. 44 42 445.0

[51] Int. Cl.$^6$ .............. H04N 1/04; H04N 9/47; G03B 27/48; G03B 27/58
[52] U.S. Cl. .............. 358/474; 358/487; 358/496; 358/497; 355/75; 399/378; 348/97
[58] Field of Search .............. 358/487, 474–488, 358/496, 497; 355/50, 72, 75; 399/369, 375, 377, 378, 384; 396/429, 430, 661; 348/64, 97

[56] References Cited

U.S. PATENT DOCUMENTS

| | | | |
|---|---|---|---|
| 4,324,484 | 4/1982 | Johnson | 355/5 |
| 5,280,370 | 1/1994 | Faust et al. | 358/488 |
| 5,283,668 | 2/1994 | Hiramatsu | 358/474 |
| 5,351,139 | 9/1994 | Miyahara et al. | 358/474 |
| 5,381,245 | 1/1995 | Johnston et al. | 358/474 |
| 5,430,550 | 7/1995 | Hashimoto et al. | 358/488 |
| 5,432,622 | 7/1995 | Johnston et al. | 358/474 |
| 5,477,343 | 12/1995 | Nodelman et al. | 358/487 |

Primary Examiner—Edward L. Coles, Sr.
Assistant Examiner—Tia M. Harris
Attorney, Agent, or Firm—Walter Ottesen

[57] ABSTRACT

An apparatus for scanning and digitizing image objects includes a conventional scanning unit for processing individual image objects with the aid of a first electro-optical scanning unit. Furthermore, an optional roll-film unit is provided for processing roll-film objects. The roll-film unit is optionally usable in combination with the conventional scanning unit. The roll-film unit too utilizes at least the first electro-optical scanning unit of the conventional scanner to digitize the roll-film object. The apparatus is especially suited for use for digitizing aerial images in individual image form or in roll-film form in the area of photogrammetry.

20 Claims, 4 Drawing Sheets

APPARATUS FOR SCANNING AND DIGITIZING PHOTOGRAPHIC IMAGE OBJECTS AND METHOD OF OPERATING SAID APPARATUS

FIELD OF THE INVENTION

The invention relates to an apparatus for scanning and digitizing image objects. The apparatus includes a conventional scanning unit for processing individual image objects as well as a roll-film unit which can be used in combination therewith. The roll-film unit is especially suited for digitizing roll-film objects.

BACKGROUND OF THE INVENTION

An important area of use of scanners is, for example, in the area of photogrammetry where aerial photographs are usually digitized with the aid of scanners. The digitized image data serve in the further photogrammetrical evaluation of the aerial images, for example, to produce maps. A suitable so-called flatbed scanner for this purpose is, for example, described in U.S. Pat. No. 5,280,370.

Flatbed scanners used in photogrammetry only permit the processing of individual image objects in the form of slide positives, slide negatives or glass plates. Often, the image material to be digitized is, however, also in rolled form, that is, archived on roll films. Image material on roll films can therefore not be processed without further measures with known flatbed scanners which permit processing of individual image objects.

On the other hand, no simple processing of individual image objects is possible with apparatus which are suitable for processing roll films.

SUMMARY OF THE INVENTION

In view of the above, it is an object of the invention to provide an apparatus for scanning and digitizing image objects which also permits processing roll films in addition to the conventional processing of individual image objects. A simple retrofit between the different modes of operation is provided.

The apparatus of the invention is for scanning and digitizing an image object including an individual image object and a roll film. The apparatus includes: a scanner including an electro-optical scanning unit for scanning the image object to provide an electrical signal containing image data of the individual image object; a roll-film unit; and, a circuit for selectively combining the scanner and the roll-film unit to process image data of the roll film.

The method of the invention is for operating an apparatus for scanning and digitizing an image object including an individual image object and a roll film. The method includes the steps of: providing a scanner including an electro-optical scanning unit for scanning an individual image object to provide an electrical signal containing image data of the individual image object; providing a roll-film unit; and, selectively processing the individual image object with the scanning unit or processing the roll film with the roll-film unit utilized in combination with the scanner.

The apparatus according to the invention makes it possible for a particular user to alternately digitize conventional individual image objects as well as processing or digitizing roll-film objects. This is achieved via an optional roll-film unit adapted to a conventional scanning unit. No significant apparatus problems result when retrofitting for the user. Depending upon the requirement, digitizing the different objects in the different modes of operation is possible.

The desired, high-resolution digitization of individual image objects with the aid of the conventional scanning unit as well as the optional digitization of roll-film objects takes place preferably via a commonly used first electro-optic scanning unit. This means that the retrofit complexity or the greater complexity for the complete apparatus is correspondingly low.

Furthermore, the roll-film unit includes still a second electro-optical scanning unit which affords advantages especially for a convenient processing of roll film. The second electro-optical scanning unit is mounted to be stationary with respect to the roll film which is guided past this unit. The second electro-optical scanning unit generates an overview image of the roll-film object on a suitable display with the overview image moving with the roll-film object. With the aid of the generated overview image, it is possible for the user to select the desired images or image sections from the plurality of images on the roll film. Only the selected images are, for example, intended to be digitized. The data from the overview image serve to position the image for the high-resolution scanning operation which follows via the commonly used first electro-optical scanning unit of both the scanner and the roll-film unit.

Furthermore, a rapid prepositioning of the roll-film object is provided based on the position evaluation of the roll-film transport means. Accordingly, the user must not transport the entire roll film to the desired image via the overview image mentioned above; instead, a rapid positioning is achieved with the aid of the above-mentioned position evaluation.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
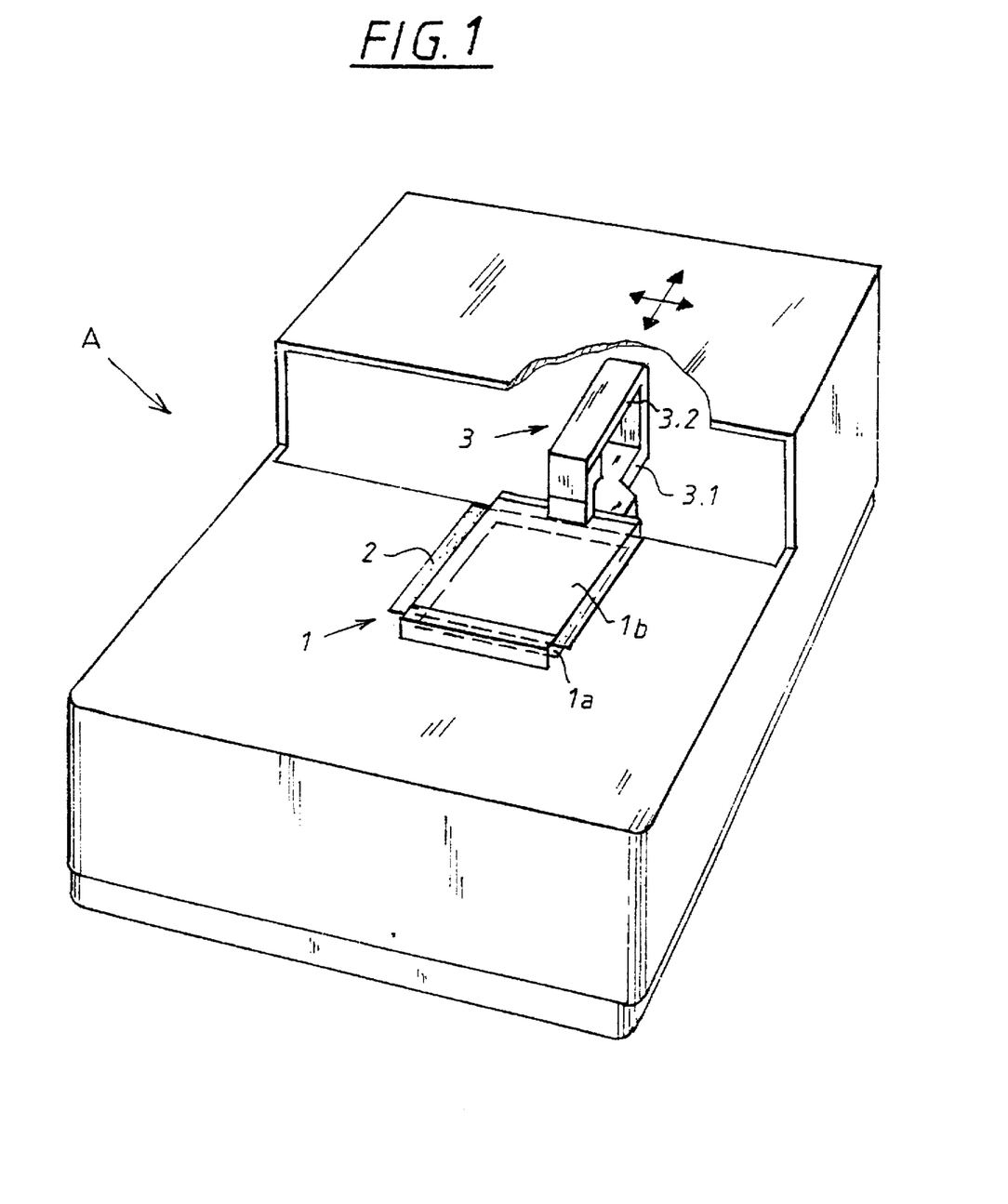
FIG. 1 is a perspective view of a conventional scanner without a separate roll-film unit.
Figure 2:
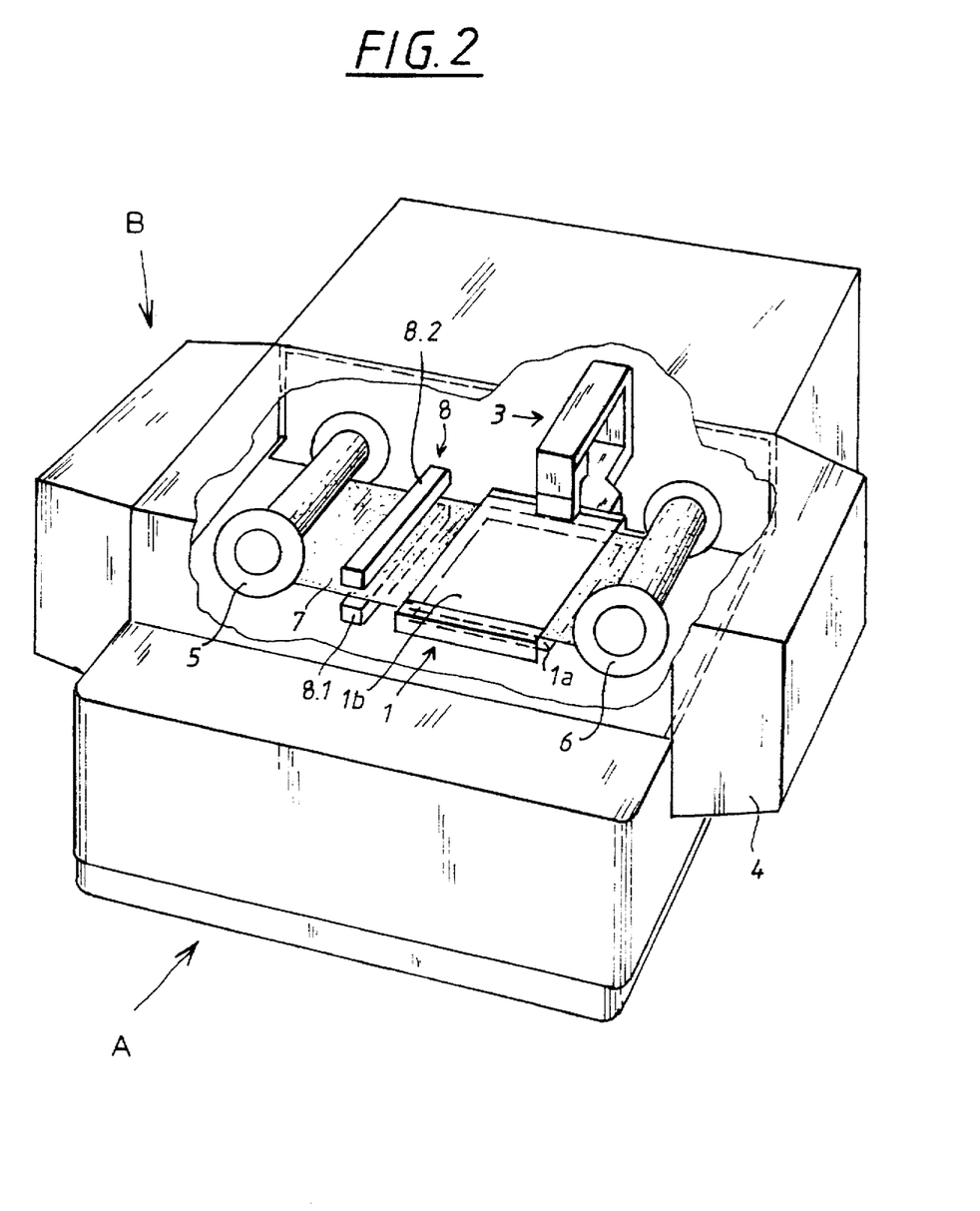
FIG. 2 is a perspective view of a conventional scanning unit with a separate roll-film unit mounted thereon.

FIG. 1 is a perspective view of a conventionally configured scanner A; whereas, FIG. 2 shows the combination of the conventional scanner A and the roll-film unit B mounted thereon according to a feature of the invention.

The conventional scanner A is here configured as a known flatbed scanner as it is shown in U.S. Pat. No. 5,280,370 incorporated herein by reference. This flatbed scanner permits digitizing the particular individual image objects with high geometric and radiometric precision.

In FIG. 1, the image carrier 1 is shown in the housing of the scanner A and comprises a pair of glass plates (1a, 1b) in a corresponding frame. The transparent individual image object 2 to be processed is mounted between the two glass plates (1a, 1b). The upper glass plate 1b can be flipped out of the way to permit placement of the object. The upper glass plate 1b can also be lifted vertically by a motor.

The individual image object 2 is mounted between the two glass plates (1a, 1b) of the image carrier 1 and is digitized, preferably with high resolution, with the aid of a first electro-optical scanning unit 20 of the conventional scanner A. For this purpose, the first electro-optical scanning unit 20 of scanner A includes a first detector unit configured as a high-resolving, color separating CCD linear array arrangement. The CCD array arrangement comprises three parallelly arranged CCD linear arrays which operate in a manner known per se.

The CCD linear array arrangement is attached to a U-shaped carrier 3 having legs (3.1, 3.2). The individual image object 2 is disposed in the image carrier 1 between these legs. The CCD linear array arrangement (not shown in FIG. 1) of the first electro-optical scanning unit 20 is mounted on the lower one of the two legs (3.1, 3.2) of the carrier 3; whereas, an illuminating unit is provided on the upper one of the two legs (3.1, 3.2) of the carrier 3. The illuminating unit is likewise not shown in FIG. 1.

Accordingly, in the embodiment shown, transparent objects are processed in transilluminating light; however, incident light processing of the object can also be realized within the apparatus according to the invention.

The U-shaped carrier 3 of the first electro-optical scanning unit 20 is, in the embodiment shown, movable in the directions shown by the arrows (see FIG. 3) relative to the individual image object 2 mounted stationary in the image carrier 1. The U-shaped carrier 3 is movable in a defined scanning plane and functions to scan the individual image object 2 in a manner known per se. For this purpose, the conventional scanner A includes one or more suitable drives which can, for example, be configured as step motors which effect the defined movement of the U-shaped carrier 3 in the scanning plane relative to the object.

In contrast to the flatbed scanner disclosed in U.S. Pat. No. 5,280,370, the object in the apparatus of the invention is fixed during the scanning operation and the scanning unit 20 is moved. This affords certain advantages especially for the processing of roll film as will be described below. These advantages become manifest as a simple mechanical configuration. A preferably high-resolving digitization of the particular image object is possible with the aid of the CCD linear array arrangement of the first electro-optical scanning unit 20. A CCD linear array arrangement suitable for this purpose is the CCD linear array arrangement having the product identification number THX 7821 B of the Thomson Company.

Other configurations can be utilized as an alternative to the detector unit of the embodiment described. For example, two-dimensional CCD arrays or known CCD linear arrays which make possible a high-resolving digitization of the object are possible.

Also not shown in FIG. 1 is a cover unit which usually covers the forward part of the conventional scanner A during scanning operation.

Figure 3:
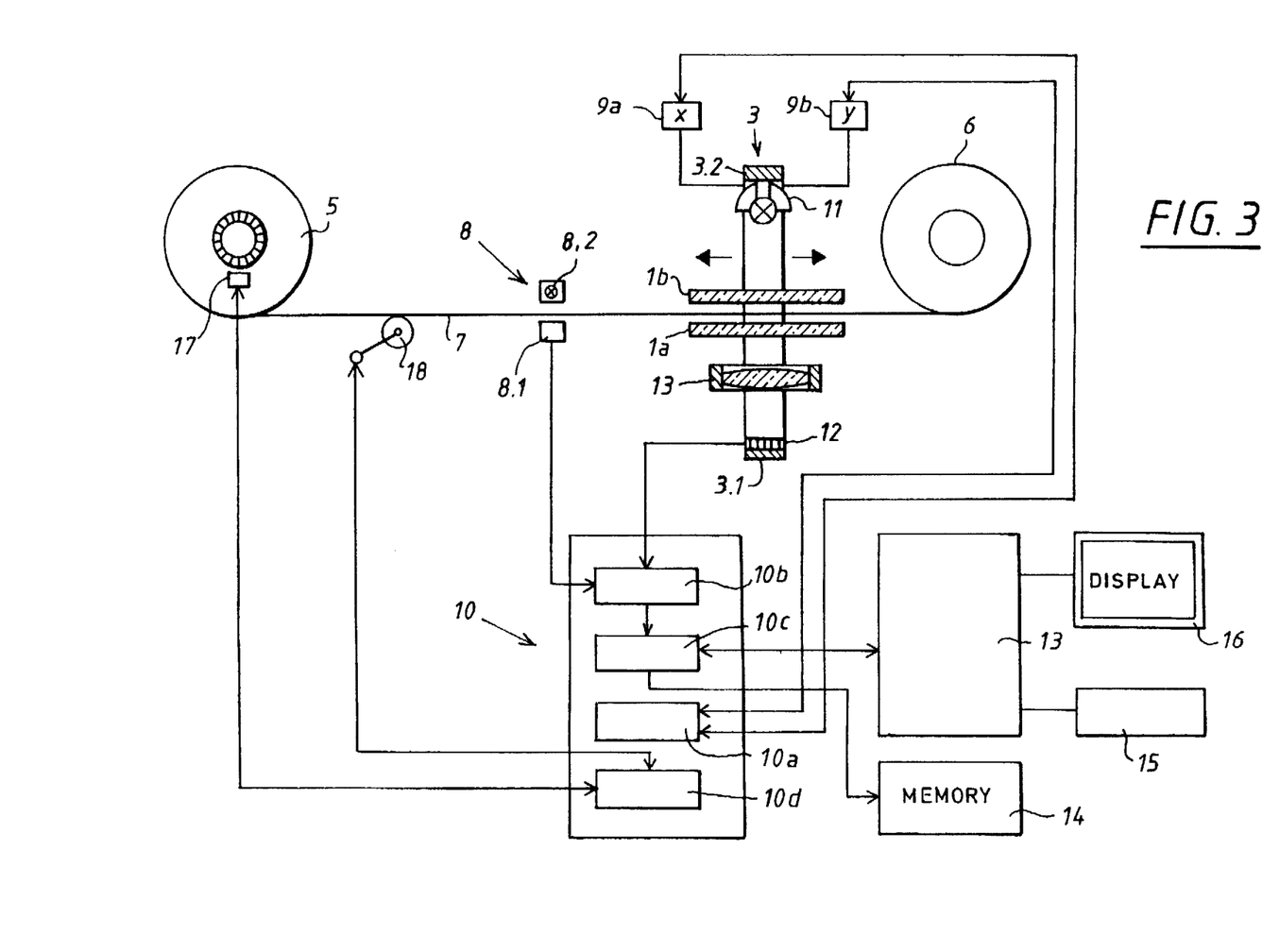
FIG. 3 is a schematic of the apparatus according to the invention equipped with a conventional scanner and a roll-film unit mounted thereon; and, FIG. 4 is a flowchart of a method of operating the apparatus according to the invention.

The entire system configuration and especially also the evaluating peripheral equipment is discussed in the description corresponding to the block circuit diagram of the entire apparatus shown in FIG. 3.

FIG. 2 shows a perspective view of the combination according to the invention which includes the conventional scanner A described above and the roll-film unit B mounted thereon. The roll-film unit B is accommodated in a housing 4 having the shape of a parallelepiped. The housing 4 is mounted transversely to the longitudinal direction of the conventional scanner A on the forward portion thereof.

The roll-film unit B includes a motor-driven payout spool 5 and a take-up spool 6 on which the roll film 7, which is to be processed, is wound. The roll film 7 is guided through the image carrier 1 of the conventional scanner A via transport means (not shown) in the form of corresponding motorized drives of the two spools (5, 6) and suitable roll-film guides. In the image carrier region 1, a conventional scanning and digitization of the roll-film object 7 is possible with the aid of the first electro-optical scanning unit 20. For this purpose, the U-shaped carrier 3 of the first electro-optical scanning unit 20 is guided as described above over the desired roll-film region in the carrier 1 and the roll-film object is preferably digitized with high resolution in a manner known per se.

In FIG. 2, a second electro-optical scanning unit 8 is shown which is provided for the roll-film unit B. The second electro-optical scanner unit 8 is stationary relative to the roll film 7 which is guided past the scanning unit 8. The second scanning unit 8 includes a second detector unit which is configured as a one-dimensional detector linear array 8.1. The detector unit is mounted below the roll film 7 which runs past this unit. A second illuminating unit 8.2 is disposed on the opposite-lying side of the roll film 7.

The second electro-optical scanning unit 8 functions, inter alia, to generate an overview image of the roll film 7 (which is moved past the scanning unit 8) in real time on a suitable display or monitor (not shown in FIG. 2). In this way, it is possible for the user to view the roll-film images already in advance of the relatively time-consuming, high-resolving digitization of the roll-film object 7 and to select the desired roll-film images which are to be digitized. Further details of this function of the apparatus according to the invention are provided in the descriptive material directed to FIGS. 3 and 4.

As further shown in FIG. 2, the apparatus according to the invention has an approximately T-shaped configuration with a relatively small mounting surface which is only insignificantly greater than the mounting surface of the conventional scanner A.

A schematic of the entire configuration of the combination according to the invention comprising the conventional scanner A with a roll-film unit B mounted thereon is shown in the block circuit diagram of FIG. 3. FIG. 3 then corresponds, in principle, to a front elevation view of the apparatus shown in FIGS. 1 and 2. For elements performing the same function, the same reference numerals are used in FIG. 3 as are used in FIGS. 1 and 2.

The scanner in FIG. 3 is configured as a conventional flatbed scanner and the image carrier thereof comprises the two glass plates (1a, 1b). The roll film 7 to be processed is guided between the two glass plates (1a, 1b).

As mentioned above, the conventional scanner includes a first electro-optical scanning unit 20 which includes a U-shaped carrier 3 having legs (3.1, 3.2). The roll film 7 to be digitized or even an individual image object is mounted on the stationary image carrier between the legs (3.1, 3.2). A relative movement between the object and the scanning unit 20 is required for the scanning operation. In the embodiment shown, this relative movement is realized via the first electro-optical scanning unit 20 which is movable in the scanning plane. In FIG. 3, the scanning plane is horizontal and perpendicular to the plane of the drawing. The U-shaped carrier 3 of the first electro-optical scanning unit 20 can be definitively positioned in the scanning plane via two motorized drives (9a, 9b). The image carrier 1 has a stationary position. The drive signals of the two motorized drives (9a, 9b) of the first electro-optical scanning unit 20 are provided by a motor control module 10a within the control computer 10.

A first illuminating unit 11 is provided on the upper leg 3.2 of the U-shaped carrier 3 of the first electro-optical scanning unit 20 on the side thereof facing toward the object. On the other side of the carrier 3, the detector unit mentioned above is mounted on the lower leg 3.1. The detector unit is in the form of CCD linear array arrangement 12.

An imaging optic 13, also shown schematically, is arranged between the image carrier or the roll film 7 and the detector unit 12 for imaging the particular object onto the detector unit 12. The imaging optic 13 is also mounted on the U-shaped carrier 3 of the first electro-optical scanning unit 20.

The detector unit 12 of the first electro-optical scanning unit 20 is configured as a CCD linear array arrangement 12 in the embodiment shown. The electro-optical scanning unit 20 is utilized for processing individual image objects as well as for processing roll film. The first electro-optical scanning unit 20 functions preferably to provide high-resolving and color separating digitization of the particular object and the minimal pixel quantity which can be realized herewith is approximately 7 μm and the geometric resolution when utilizing a suitable imaging optic 13 is approximately ¼ μm.

The read-out operation from the CCD linear array arrangement 12 or the acceptance of the generated CCD data is controlled via a corresponding CCD processing module 10b within the control computer 10. Thereafter, the signals obtained either reach a host computer 22 for further processing and/or a suitable memory 14. These signals reach the host computer 22 or the memory 14 via a rapid interface 10c in the control computer 10. The memory 14 can be configured as a conventional computer hard disc, tape memory, magneto-optical disc or other known mass memory.

A suitable user interface position in the form of a keypad 15 as well as a display 16 are connected to the host computer 22. The digitized images are presented or displayed on the display 16 and the photogrammetrical further processing and evaluation of the image data obtained is then possible.

As shown in FIG. 3, the second electro-optical scanning unit 8 is assigned to the roll-film unit. The second electro-optical scanning unit 8 includes a detector unit 8.1 configured as a CCD linear array mounted below the roll film 7 and a second illuminating unit 8.2 mounted on the other side of the roll film 7. The CCD linear array 8.1 covers preferably the entire width of the roll film 7 which is transported past the array. The digitization of the roll-film object 7 takes place via the second electro-optical scanning unit 8 in transmitted light in the embodiment shown. In principle, an incident light configuration within the apparatus according to the invention is also realizable.

According to another embodiment (not shown), the illuminating unit 8.2 can include fiber optic means with a condenser optic mounted forward thereof.

The elements of the second electro-optical scanning unit 8, that is, the detector unit 8.1 as well as the second illuminating unit 8.2 are mounted so as to be stationary relative to the roll film 7 which is transported past these elements. The relative movement, which is necessary for scanning, between the object and the second electro-optical scanning unit 8 is provided by the roll film 7 with its movement past the second electro-optical scanning unit 8.

The second electro-optical scanning unit 8 is assigned to the roll-film unit B and the roll film 7 is transported past this scanning unit. In the embodiment shown, the scanning unit 8 generates monochrome image data having relatively low resolution. The control of the read-out operation takes place likewise via the CCD processing module 10b within the control computer 10. The further signal processing is, in principle, identical to the above-described high-resolution object digitization by means of the first electro-optical scanning unit 20. Furthermore, the image data generated via the second electro-optical scanning unit 8 are displayed in real time on the display 16 of the host computer 13.

In principle, the display of the detected image data can also take place on an image screen which is connected to the control computer 10. The CCD linear array having the product designation CIPS 305 MA 400 of the Toshiba Company is suitable for use as a detector unit within the second electro-optical scanning unit 8. This CCD linear array supplies a geometric resolution of 400 dpi which is adequate for the overview image. Here too, alternative detector units such as CCD arrays and the like can be used which make possible the required scan rates.

With the continuously generated overview image, it is possible for the user to find the image of interest or an image section on the roll film in an interactive operating mode and to select the image or image section for high-resolution digitization via the first electro-optical scanning unit 20 as described above. For this scanning operation, significantly more time is necessary because of the lower scanning speed so that this can take place in an automatic batch operation, for example, at night.

Figure 4:
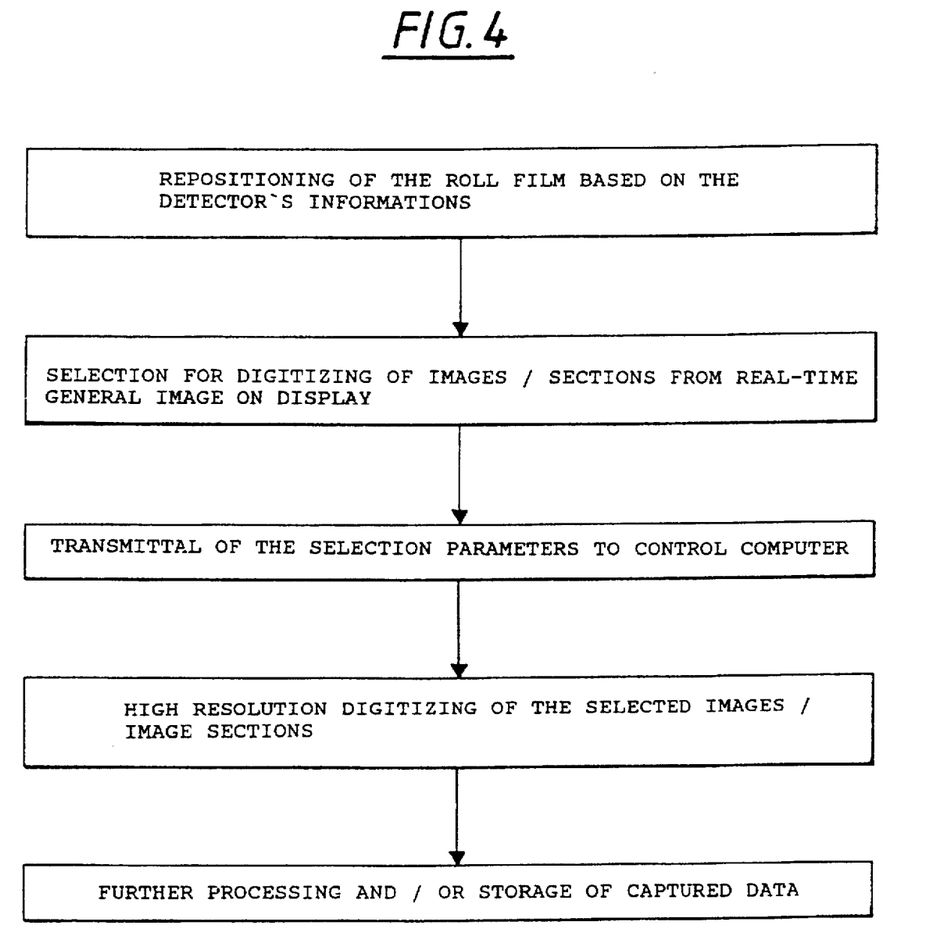

An advantageous method for operating the apparatus according to the invention is shown in the flowchart of FIG. 4. This method provides for selecting or determining the desired images and/or image sections on the roll-film object with the aid of an overview image generated in real time in the interactive roll film operating mode described above. The selected data are stored in the control computer and thereafter, in the automatic batch operation, the images or image sections are digitized on the basis of the selected data highly resolved via the first electro-optical scanning unit 20.

The method described for generating an overview image of reduced resolution in real time and the subsequent high-resolution digitization of selected roll-film sections is also possible with only a single electro-optical scanning unit. In this case, the electro-optical detector unit to be utilized must only be able to be operated in a suitable low-resolution mode and a high-resolution mode. In the low-resolution mode, an adequately high scan speed must be provided.

To assure the most convenient processing of the roll film, additional measures within the apparatus are provided which are described below. The scanning operation with the second electro-optical scanning unit 8 is possible only with a limited speed of approximately 20 cm/sec because of the limited scanning rate of the detector unit or CCD linear array used. For this reason, it is advantageous for the prepositioning of the roll film 7, to arrange at least one but preferably several detectors (17, 18) within the roll-film unit. In the embodiment shown in FIG. 3, a first detector 17 is assigned to the payout spool 5 of the roll-film unit. The first detector 17 detects the rotational angle during the rotational movement of the payout spool 5. The first detector 17 is preferably configured as a rotation pulse transducer which is available in the marketplace under the product identification HEDS 5540 of the Hewlett Packard Company.

In addition, a further second detector 18 is provided directly on the transported roll film 7 and detects the distance traveled by the transported film. In the embodiment shown, the second detector 18 is configured as a pick off wheel likewise having a pulse generator assigned thereto. The signals supplied by the two detectors (17, 18) reach a roll-film position module 10d which is provided in the control computer 10. The absolute length L of the film still available on the payout spool 5 is determined on the basis of the supplied signals of the detectors (17, 18) as well as a series of known system parameters via the roll-film position module 10d in the control computer 10. Furthermore, in this way, the position of an image with a known image number is continuously known.

The determination of the film length L remaining on the payout spool 5 takes place within the roll-film position module 10d, for example, on the basis of the following equation:

$$L = \frac{\pi}{d(k+1)} \cdot \left[ \frac{e_s^2}{e_g^2} \cdot \frac{n_g^2}{n_s^2} (r_g^2) - r_s^2 \right]$$

wherein:

d=film thickness;

k=air factor (a measure as to how much air is enclosed in the film roll, for example 10%);

$e_s$=pulse generator resolution of the film spool;

$e_s$=pulse generator resolution of the pickoff wheel;

$n_s$=number of the measured pulses of the film spool pulse generator;

$n_g$=number of the measured pulses of the pickoff wheel pulse generator;

$r_s$=radius of the shaft of the payout spool;

$r_g$=radius of the pickoff wheel; and,

L=length of the film still available on the payout spool.

If the user now wants to only look at a specific region of the roll film 7, then the prepositioning of the roll film 7 takes place via a rapid rewinding at a film transport speed of approximately 1.5 m/sec on the basis of the data supplied by the roll-film position module 10d. For this purpose, the corresponding control signals are transmitted from the control computer 10 to the drives of the roll-film or to the transport means of the roll-film unit. The user then views the overview image via the display 16 and selects, as described above, the images or image sections of interest. The overview image is generated during rewinding in real time.

The method described for prepositioning the roll film 7 is also possible in the above-mentioned automated batch operation. Here too, the roll film 7 can be rapidly prepositioned based on the position data determined from the roll film position module 10d and thereafter, the automated high-resolution digitization of the desired image section can take place. In addition, the position data, which are determined by the roll-film position module 10d, are still relevant with respect to the film material still available on the payout spool 5 in order to timely stop roll-film processing before the roll film 7 runs off the payout spool 5. For this purpose, a corresponding display of a warning signal for the user is provided.

The apparatus of the invention thereby affords the possibility of conveniently digitizing roll-film material in addition to processing individual image objects. For this purpose, the processing of the roll film is optional without a greater retrofit resulting or even affecting the conventional scan unit for processing the individual image objects.

It is understood that the foregoing description is that of the preferred embodiments of the invention and that various changes and modifications may be made thereto without departing from the spirit and scope of the invention as defined in the appended claims.

What is claimed is:

1. An apparatus for scanning and digitizing an image object including an individual image object and a roll film, the apparatus comprising:

a scanner including an electro-optical scanning unit for scanning said individual image object to provide an electrical signal containing image data of the individual image object;

a roll-film unit;

a circuit for selectively combining said scanner and said roll-film unit to process image data of the roll film; and, said roll-film unit being adapted to utilize said electro-optical scanning unit for also processing said image data of said roll film.

2. The apparatus of claim 1, said electro-optical scanning unit including:

a U-shaped carrier having first and second legs;

an image supporting device for supporting the image object;

said image supporting device being arranged between said first and second legs; and, a detector mounted on one of said legs adjacent said image supporting device for digitizing the image object at high resolution.

3. The apparatus of claim 2, wherein said image object defines a scanning plane; and, said electro-optical scanning unit further includes a motor drive for definitively positioning said U-shaped carrier in said scanning plane.

4. The apparatus of claim 1, said roll-film unit including: a housing; a transport device for transporting the roll film past said electro-optical scanning unit; and, a detector device for detecting the position of the roll film; and, said transport device and said detector device being mounted in said housing.

5. The apparatus of claim 4, said transport device including: a payout spool from which the roll film is payed out and a take-up spool for taking up the roll film payed out from said payout spool; and, a motor for driving said payout and/or take-up spools.

6. The apparatus of claim 5, said detector device including: a first sensor for sensing the angle through which said payout spool rotates when paying out the roll film and emitting a first signal indicative of said angle; and, a second sensor for detecting the linear amount of the roll film transported past said second sensor and emitting a second signal indicative of said linear amount; and, said circuit including a control computer having a roll-film position module for receiving said signals of said first and second sensors to make an exact determination of the position of the roll film.

7. The apparatus of claim 1, said electro-optical scanning unit being a first electro-optical scanning unit; said roll-film unit including a second electro-optical scanning unit which is mounted in a fixed position relative to the roll film for generating a signal containing data indicative of the images present on the roll film; and, said circuit including a display and a computer for processing said signal to generate an overview image in real time on said display of the images on the roll film.

8. An apparatus for scanning and digitizing an image object including an individual image object and a roll film, the apparatus comprising:

a scanner including an electro-optical scanning unit for scanning said image object to provide an electrical signal containing image data of the individual image object;

a roll-film unit;

a circuit for selectively combining said scanner and said roll-film unit to process image data of the roll film;

said roll-film unit being adapted to utilize said electro-optical scanning unit for also processing said image data of said roll film;

said electro-optical scanning unit being a first electro-optical scanning unit;

said roll-film unit including a second electro-optical scanning unit which is mounted in a fixed position relative to the roll film for generating a signal containing data indicative of the images present on the roll film;

said circuit including a display and a computer for processing said signal to generate an overview image in real time on said display of the image on the roll film;

said first electro-optical scanning unit including: a first illuminating unit for illuminating the roll film at a first location thereon and a first detector for digitizing an image section of the roll film;

said second electro-optical scanning unit including: a second illuminating unit for illuminating the roll film; and, a second detector mounted opposite said second illuminating unit; and, said roll-film unit including a transport device for transporting the roll film between said second illuminating unit and said second detector.

9. The apparatus of claim 8, wherein said first detector is a high-resolution, color separating CCD linear array arrangement and said second detector is a CCD linear array for generating monochrome image data.

10. A method for operating an apparatus for scanning and digitizing an image object including an individual image object and a roll film, the method comprising the steps of:

providing a scanner including an electro-optical scanning unit for scanning said individual image object to provide an electrical signal containing image data of said individual image object;

providing a roll-film unit;

selectively processing said individual image object with said scanning unit or processing image data of said roll film with said roll-film unit utilized in combination with said scanner; and, adapting said roll-film unit to utilize said electro-optical scanning unit for also processing said image data of said roll film.

11. The method of claim 10, wherein said electro-optical scanning unit is a first electro-optical scanning unit and said apparatus includes a second electro-optical scanning unit; the method applied to roll film comprising the further steps of:

passing the roll film past said second electro-optical scanning unit to generate an overview image of the roll film with low resolution; and, p1 passing the roll film past said first electro-optical scanning unit of said scanner to digitize selected sections of the roll film on the basis of data obtained from the first scanning step.

12. The method of claim 11, wherein said roll film includes a device for detecting the position of the roll film relative to at least one of the scanning units and for generating data indicative of said position; and, wherein the method comprises the further step of utilizing said data in addition to data obtained from passing the roll film past said second electro-optical scanning unit.

13. A method for operating an apparatus for scanning and digitizing an image object including an individual image object and a roll film, the method being applied to roll film and comprising the steps of:

providing a scanner including a first electro-optical scanning unit for scanning said individual image object to provide an electrical signal containing image data of said individual image object;

providing a second electro-optical scanning unit;

providing a roll-film unit which includes a device for detecting the position of the roll film relative to at least one of the scanning units and for generating data indicative of said position;

selectively processing said individual image object with said scanning unit or processing image data of said roll film with said roll-film unit utilized in combination with said scanner;

adapting said roll-film unit to utilize said electro-optical scanning unit for also processing said image data of said roll film;

passing the roll film past said second electro-optical scanning unit to generate an overview image of the roll film with low resolution;

passing the roll film past said first electro-optical scanning unit of said scanner to digitize selected sections of the roll film on the basis of data obtained from the first scanning step;

utilizing said data indicative of said position in addition to data obtained from passing the roll film past said second electro-optical scanning unit; and, said step of passing the roll film past said first electro-optical scanning unit taking place in a batch operation.

14. The combination of a roll-film unit for holding a roll film and an apparatus for scanning and digitizing an image object including an individual image object and said roll film, the combination comprising:

said scanner including an electro-optical scanning unit for scanning said individual image object to provide an electrical signal containing image data of said individual image object;

said roll-film unit being mounted on said scanner;

a mounting interface for locating said roll-film unit on said scanner so as to place said roll film in operative proximity to said electro-optical scanning unit to also permit said scanning unit to scan an image on said roll film; and, a circuit for a selectivity combining set scanner and said roll-film unit to process image data of said data of said image on said roll film.

15. The combination of claim 14, the image object defining a scanning plane and said electro-optical scanning unit including:

a U-shaped carrier having first and second legs;

an image supporting device for supporting the image object;

said image supporting device being arranged between said first and second legs;

a detector mounted on one of said legs adjacent said image supporting device for digitizing the image object at high resolution; and, a motor drive for definitively positioning said U-shaped carrier in said scanning plane.

16. The combination of claim 14, said roll-film unit including: a housing; a transport device for transporting the roll film past said electro-optical scanning unit; and, a detector device for detecting the position of the roll film; and, said transport device and said detector device being mounted in said housing.

17. The combination of claim 16, said transport device including: a payout spool from which the roll film is payed out and a take-up spool for taking up the roll film payed out from said payout spool; and, a motor for driving said payout and/or take-up spools.

18. The combination of claim 17, said detector device including: a first sensor for sensing the angle through which said payout spool rotates when paying out the roll film and emitting a first signal indicative of said angle; and, a second sensor for detecting the linear amount of the roll film transported past said second sensor and emitting a second signal indicative of said linear amount; and, said circuit including a control computer having a roll-film position module for receiving said signals of said first and second sensors to make an exact determination of the position of the roll film.

19. The combination of claim 14, said electro-optical scanning unit being a first electro-optical scanning unit; said roll-film unit including a second electro-optical scanning unit which is mounted in a fixed position relative to the roll film for generating a signal containing data indicative of the images present on the roll film; and, said circuit including a display and a computer for processing said signal to generate an overview image in real time on said display of the images on the roll film.

20. The combination of a roll-film unit for holding a roll film and an apparatus for scanning and digitizing an image object including an individual image object and said roll film, the combination comprising:

said scanner including an electro-optical scanning unit for scanning said individual image object to provide an electrical signal containing image data of said individual image object;

said roll-film unit being mounted on said scanner;

a mounting interface for locating said roll-film unit on said scanner so as to place said roll film in operative proximity to said electro-optical scanning unit to also permit said scanning unit to scan an image on said roll film;

a circuit for selectively combining said scanner and said roll-film unit to process image data of said image on said roll film;

said electro-optical scanning unit being a first electro-optical scanning unit; said roll-film unit including a second electro-optical scanning unit which is mounted in a fixed position relative to the roll film for generating a signal containing data indicative of the images present on the roll film;

said circuit including a display and a computer for processing said signal to generate an overview image in real time on said display of the images on the roll film;

said first electro-optical scanning unit including: a first illuminating unit for illuminating the roll film at a first location thereon and a first detector for digitizing an image section of the roll film;

said second electro-optical scanning unit including: a second illuminating unit for illuminating the roll film; and, a second detector mounted opposite said second illuminating unit; and, said roll-film unit including a transport device for transporting the roll film between said second illuminating unit and said second detector.

* * * * *

UNITED STATES PATENT AND TRADEMARK OFFICE
CERTIFICATE OF CORRECTION

PATENT NO. : 5,726,773
DATED : March 10, 1998
INVENTOR(S) : Herwig Mehlo, Karl-Heinz Preis and Michael Raasch It is certified that error appears in the above-indentified patent and that said Letters Patent is hereby corrected as shown below:

On the title page, [75] Inventors: delete "Karl-Heinz Prois" and substitute -- Karl-Heinz Preis -- therefor.

In column 7, line 22: delete "$e_s$=pulse generator resolution of the pickoff wheel;" and substitute -- $e_g$=pulse generator resolution of the pickoff wheel -- therefor.

In column 7, line 35: between "roll-film" and "or", insert -- unit --.

In column 8, line 59: between "said" and "image", insert -- individual --.

In column 9, line 9: delete "image" and substitute -- images -- therefor.

In column 9, line 49: delete "p1".

In column 10, line 40: delete "a selectivity combining set" and insert -- selectively combining said -- therefor.

UNITED STATES PATENT AND TRADEMARK OFFICE
CERTIFICATE OF CORRECTION

PATENT NO.  : 5,726,773
DATED       : March 10, 1998
INVENTOR(S) : Herwig Mehlo, Karl-Heinz Preis and Michael Raasch It is certified that error appears in the above-indentified patent and that said Letters Patent is hereby corrected as shown below:

In column 10, line 41:  delete "data of said" (second occurrence).

Signed and Sealed this

Eighteenth Day of August, 1998

*Attest:*

BRUCE LEHMAN

*Attesting Officer*     *Commissioner of Patents and Trademarks*